(12) United States Patent
Miki et al.

(10) Patent No.: US 8,265,030 B2
(45) Date of Patent: Sep. 11, 2012

(54) BASE STATION APPARATUS, USER EQUIPMENT TERMINAL, AND METHOD IN MOBILE COMMUNICATION SYSTEM

(75) Inventors: Nobuhiko Miki, Yokohama (JP);
Yoshihisa Kishiyama, Yokosuka (JP);
Kenichi Higuchi, Yokohama (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 327 days.

(21) Appl. No.: 12/598,116

(22) PCT Filed: Apr. 28, 2008

(86) PCT No.: PCT/JP2008/058197
§ 371 (c)(1),
(2), (4) Date: Jan. 20, 2010

(87) PCT Pub. No.: WO2008/139923
PCT Pub. Date: Nov. 20, 2008

(65) Prior Publication Data
US 2010/0150087 A1    Jun. 17, 2010

(30) Foreign Application Priority Data
May 1, 2007    (JP) .................................. 2007-121307

(51) Int. Cl.
*H04B 7/212* (2006.01)
(52) U.S. Cl. ..................................................... 370/330
(58) Field of Classification Search ........................ None
See application file for complete search history.

(56) References Cited

U.S. PATENT DOCUMENTS

2007/0025383 A1* 2/2007 Katar et al. .................... 370/442
2008/0267118 A1* 10/2008 Cai et al. ........................ 370/329
2009/0225708 A1* 9/2009 Harada et al. ................. 370/329

OTHER PUBLICATIONS

3GPP TSG RAN WG2 meeting #55, R2-062913, "Uplink resource allocation scheme (persistent scheduling)," NTT DoCoMo, Oct. 9-13, 2006, 4 pages.
3GPP TSG-RAN WG2 Meeting #57, R2-070476, "Uplink Scheduling for VoIP," Nokia, Feb. 12-16, 2007, 15 pages.
3GPP TSG RAN WG2 Meeting #56bis, R2-070113, "Optimization of uplink resource assignment strategies," CATT, Jan. 15-19, 2007, 4 pages.
3GPP TSG RAN WG2 #56bis, R2-070128, "Persistent scheduling in LTE DL," IPWireless, Jan. 15-19, 2007, 4 pages.
3GPP TR 25.814 V7.0.0, Jun. 2006, "Physical layer aspects for evolved Universal Terrestrial Radio Access (UTRA)," 126 pages.

(Continued)

*Primary Examiner* — Raj Jain
(74) *Attorney, Agent, or Firm* — Osha Liang LLP

(57) ABSTRACT

A base station apparatus is disclosed to be used in a mobile communication system where Persistent Scheduling is performed. The base station apparatus includes a radio communication unit configured to perform radio communications with a specific user equipment terminal using radio resources provided every predetermined period based on the Persistent Scheduling and an allocation unit configured to allocate radio resources to a user equipment terminal other than the specific user equipment by selecting the radio resources that are not used for uplink or downlink packet data for the specific user equipment from among radio resources provided the every predetermined period.

9 Claims, 12 Drawing Sheets

OTHER PUBLICATIONS

3GPP TSG RAN WG Meeting #47bis, R1-070103, "Downlink L1/L2 Control Signaling Channel Structure: Coding," Jan. 15-19, 2007, 17 pages.

3GPP TSG-RAN WG1 #43, R1-051511, "HS-SCCH-less HS-PDSCH operation for improved support of IMS real-time services," pp2, Section 3, Nov. 7-11, 2005, 2 pages.

3GPP TSG-Ran WG2 Meeting #51, R2-060550, "Further details on HS-SCCH-less operation for VoIP traffic," pp1, Section 2, Feb. 13-17, 2006, 2 pages.

International Search Report issued in PCT/JP2008/058197, mailed on Aug. 12, 2008, with translation, 10 pages.

Written Opinion issued in PCT/JP2008/058197, mailed on Aug. 12, 2008, 5 pages.

* cited by examiner

BASE STATION APPARATUS, USER EQUIPMENT TERMINAL, AND METHOD IN MOBILE COMMUNICATION SYSTEM

TECHNICAL FIELD

The present invention generally relates to a technical field of mobile communications, and more particularly to a mobile communication system, a base station apparatus, user equipment, and a method based on a next-generation mobile communication technique.

BACKGROUND ART

As a next-generation system of the W-CDMA (Wideband Code Division Multiple Access) system, HSDPA (High Speed Downlink Packet Access) system, HSUPA (High Speed Uplink Packet Access) system and the like, an LTE system has been studied by 3GPP ($3^{rd}$ Generation Partnership Project) which is a standards body of the W-CDMA. In the LTE system as a radio access system, an OFDM (Orthogonal Frequency Division Multiplexing) scheme and an SC-FDMA (Single-Carrier Frequency Division Multiple Access) scheme have been studied as prospective candidate schemes to be applied to the downlink communications system and the uplink communications system, respectively (see, for example, Non Patent Document 1).

The OFDM scheme is a multi-carrier transmission scheme in which a frequency band is divided into plural sub-carriers having narrower frequency bands, and data are mapped onto the sub-carriers. By closely and orthogonally arranging the sub-carriers along the frequency axis, faster transmission is expected to be achieved and the efficiency of using the frequency band is also expected to be improved.

The SC-FDMA scheme is a single carrier transmission scheme in which a frequency band is divided with respect to user equipment (hereinafter may be referred to as user equipment (UE) terminal or mobile station) in a manner so that different frequencies can be separately used among plural terminals (user equipment terminals); and as a result, interference between terminals may be easily and effectively reduced. Further, preferably, in the SC-FDMA scheme, a range of transmission power fluctuation may be made smaller; therefore lower energy consumption of terminals can be achieved and a wider coverage area can be obtained.

In both uplink and downlink of the LTE system, communications can be performed by allocating one or more resource blocks to the mobile station. More specifically, the resource blocks may be shared among plural mobile stations in the system. In the LTE system, the base station (hereinafter may be referred to as base station apparatus) determines which resource blocks are to be allocated to which mobile station from among plural mobile stations with respect to each Sub-frame having 1 ms period (this allocation process may be called Scheduling). The Sub-frame may also be called a TTI (Transmission Timer Interval). In downlink, the base station apparatus transmits a shared channel using one or more resource blocks to the mobile station selected by the Scheduling. The shared channel is called a Physical Downlink Shared Channel (PDSCH). In uplink, the mobile station selected by the Scheduling transmits the shared channel using one or more resource blocks. This shared channel is called a Physical Uplink Shared Channel (PUSCH).

In a communication system using the shared channels, it is required to perform (report) Signaling designating which shared channel is allocated to which user equipment terminal. In the LTE system, a control channel is used for the Signaling, and the control channel is called a Physical Downlink Control Channel (PDCCH) or a Downlink L1/L2 Control Channel (DL-L1/L2 Control Channel). The Physical Downlink Control Channel (PDCCH) may include information items such as Downlink Scheduling Information, Acknowledgement information (ACK/NACK), Uplink Scheduling Grant, an Overload Indicator, Transmission Power Control Command Bit and the like (see, for example, Non Patent Document 2).

The Downlink Scheduling Information and Uplink Scheduling Grant correspond to the information on which the Signaling is to be performed. The Downlink Scheduling Information includes the information of the shared channel in downlink. More specifically, the Downlink Scheduling Information includes allocation information of the Resource Blocks in downlink, identification information of the user equipment (UE-ID), the number of streams, information of Precoding Vector, data size, modulation scheme, information of Hybrid Automatic Repeat reQuest (HARQ) and the like.

The Uplink Scheduling Grant includes information of the shared channel in uplink. More specifically, the Uplink Scheduling Grant includes allocation information of the Resources in uplink, the UE-ID, data size, modulation scheme, information of transmission power in uplink, information of a Demodulation Reference Signal in Uplink MIMO and the like.

In downlink, a Common Control Physical Channel (CCPCH) is also transmitted. The Common Control Physical Channel (CCPCH) includes a Broadcast Channel (BCH). The Broadcast Channel (BCH) transmitted in the Common Control Physical Channel (CCPCH) may be called a static Broadcast Channel. In addition to the static Broadcast Channel, there is also provided a dynamic Broadcast Channel (Dynamic part). The dynamic Broadcast Channel is mapped to the Physical Downlink Shared Channel (PDSCH). In this case, the Physical Downlink Shared Channel (PDSCH) transmits the Downlink Scheduling Information for the dynamic Broadcast Channel.

An uplink control channel transmits a downlink Channel Quality Indicator (CQI), the Acknowledgement information with respect to the Physical Downlink Shared Channel (PDSCH) and the like. The Channel Quality Indicator (CQI) is used in, for example, the Scheduling process and an Adaptive Modulation and Coding Scheme (AMCS) with respect to the Physical Downlink Shared Channel (PDSCH).

As described above, in the proposed mobile communication system, basically, the information indicating which shared channel is allocated to which user equipment terminal with respect to each Sub-frame is required to be reported by Signaling using the Downlink L1/L2 Control Channel (DL-L1/L2 Control Channel). Further, this Scheduling is to be required (reported) regardless of the length of the packet data to be transmitted. Therefore, even when the packet data having a short length are required to be frequently transmitted, it is required to perform Signaling designating which shared channel is allocated to which user equipment terminal with respect to each packet data transmission using the Downlink L1/L2 Control Channel (DL-L1/L2 Control Channel). As a result, the ratio of the radio resources allocated to the control channel increases, the overhead rate may be accordingly increased, and the number of radio resources to be allocated to the data channel may be reduced. Typical examples of the packet data that have a short length and that are generated frequently may be voice packet data, VoIP, real-time data, and the like.

To overcome the problems, a method called Persistent Scheduling has been proposed. In this method, a downlink data channel (typically, the voice packet data) is transmitted using a certain fixed transport format based on a specific cycle such as 20 ms. The transport format includes information items necessary to decode the data channel, the information items indicating the modulation scheme, the channel coding rate and the like. For example, the modulation scheme and the channel coding rate are fixed to QPSK and ⅓, respectively, and the data are known to (i.e., shared between) the base station and the user equipment terminals. Therefore, the user equipment terminals may adequately receive the downlink shared channel (DL-SCH) even when the control channel such as the L1/L2 control channel with respect to each Subframe is not reported. Such Persistent Scheduling is described in, for example, Non Patent Documents 3 and 4.

Non Patent Document 1: 3GPP TR 25.814 (V7.0.0), "Physical layer Aspects for Evolved UTRA," June 2006

Non Patent Document 2: 3GPP R1-070103, Downlink L1/L2 Control Signaling Channel Structure: Coding Non Patent Document 3: R1-051511, 7-11th Nov., 2005, 3GPP TSG-RAN WG1 #43, Qualcomm Europe, pp 2, Section 3

Non Patent Document 4: R2-060550, 13-17 Feb., 2006, 3GPP TSG-RAN WG2 #51, Qualcomm Europe, pp 1, Section 2

DISCLOSURE OF INVENTION

Problems to be Solved by the Invention

From the viewpoint of reducing the frequency of Signaling and overhead rate, it may be effective to fix the allocation of radio resources to specific users in accordance with the principle of the Persistent Scheduling. However, in such a case, an effective use of radio resources may not be achieved.

According to an embodiment of the present invention, it may become possible to effectively use the radio resources even when the Persistent Scheduling is performed.

Means for Solving the Problems

According to a first aspect of the present invention, there is provided a base station apparatus to be used in a mobile communication system where Persistent Scheduling is performed. The base station apparatus includes a radio communication unit performing radio communications with a specific user equipment terminal using radio resources provided every predetermined period based on the Persistent Scheduling and an allocation unit allocating radio resources to a user equipment terminal other than the specific user equipment by selecting the radio resources that are not used for uplink or downlink packet data for the specific user equipment from among radio resources provided the every predetermined period.

According to a second aspect of the present invention, there is provided a base station apparatus to be used in a mobile communication system where Persistent Scheduling is performed. The base station apparatus includes a radio communication unit performing radio communications with a user equipment terminal using radio resources provided every predetermined period based on the Persistent Scheduling, a first determination unit determining whether either uplink or downlink packet data of the user equipment terminal are required to be retransmitted, and a generation unit generating a downlink L1/L2 control signal including scheduling information designating radio resources to be used for the retransmission packet data. Further in the base station apparatus, when determining that it is required to retransmit the uplink or downlink packet data of the user equipment terminal, the downlink L1/L2 control signal is transmitted to the user equipment terminal and the packet data to be retransmitted are transmitted by using the radio resources designated by the scheduling information.

The base station apparatus may further include a second determination unit determining whether the uplink or downlink packet data of the user equipment terminal are to be transmitted in a talk-spurt period transmitted every first predetermined period. Further, in the base station apparatus, when determining that the uplink or downlink packet data are not to be transmitted in the talk-spurt period, the radio communications with the user equipment terminal may be performed by using the radio resources provided every second predetermined period longer than the first predetermined period.

According to a third aspect of the present invention, there is provided a base station apparatus to be used for a mobile communication system where Persistent Scheduling is performed. The base station apparatus includes a radio communication unit performing radio communications with a user equipment terminal using radio resources provided every predetermined period based on the Persistent Scheduling, a determination unit determining whether uplink or downlink packet data of the user equipment terminal are to be transmitted in a talk-spurt period transmitted every predetermined period, and a generation unit, when determining that the uplink or downlink packet data are not to be transmitted in the talk-spurt period, generating a downlink L1/L2 control signal including scheduling information designating radio resources to be used for the transmission of the uplink or downlink packet data, wherein, when determining that the uplink or downlink packet data are not to be transmitted in the talk-spurt period, the downlink L1/L2 control signal is transmitted to the user equipment terminal and the uplink or downlink packet data are transmitted using the radio resources designated by the scheduling information.

According to a fourth aspect of the present invention, there is provided a user equipment terminal to be used for a mobile communication system where Persistent Scheduling is performed. The user equipment terminal includes a transmission/receiving unit performing radio communications with a base station apparatus using radio resources provided every predetermined period and a determination unit determining whether downlink packet data transmitted to the user equipment are received within a talk-spurt period repeated the every predetermined period. Further, in the user equipment terminal, when determining that the downlink packet data are not to be received within the talk-spurt period, meaningful packet data are extracted by performing a demodulation process with respect to downlink packet data transmitted using plural candidate radio resources provided the every predetermined period.

ADVANTAGEOUS EFFECT OF THE INVENTION

According to an embodiment of the present invention, it may become possible to effectively use the radio resources even when the Persistent Scheduling is performed.

EXPLANATION OF REFERENCES

50: CELL
$100_1$, $100_2$, $100_3$, $100_n$: MOBILE STATION(S) (USER EQUIPMENT TERMINAL(S))
102: TRANSMISSION/RECEIVING ANTENNA
104: AMPLIFIER
106: TRANSMISSION/RECEIVING SECTION
108: BASEBAND SIGNAL PROCESSING SECTION
110: APPLICATION SECTION
1081: LAYER 1 PROCESSING SECTION
1082: MAC PROCESSING SECTION
200: BASE STATION APPARATUS
202: TRANSMISSION/RECEIVING ANTENNA
204: AMPLIFIER
206: TRANSMISSION/RECEIVING SECTION
208: BASEBAND SIGNAL PROCESSING SECTION
210: RADIO RESOURCE MANAGEMENT SECTION
212: TRANSMISSION PATH INTERFACE
2081: LAYER 1 PROCESSING SECTION
2082: MAC PROCESSING SECTION
2083: RLC PROCESSING SECTION
300: ACCESS GATEWAY APPARATUS
400: CORE NETWORK

BEST MODE FOR CARRYING OUT THE INVENTION

System Summary

Figure 1:
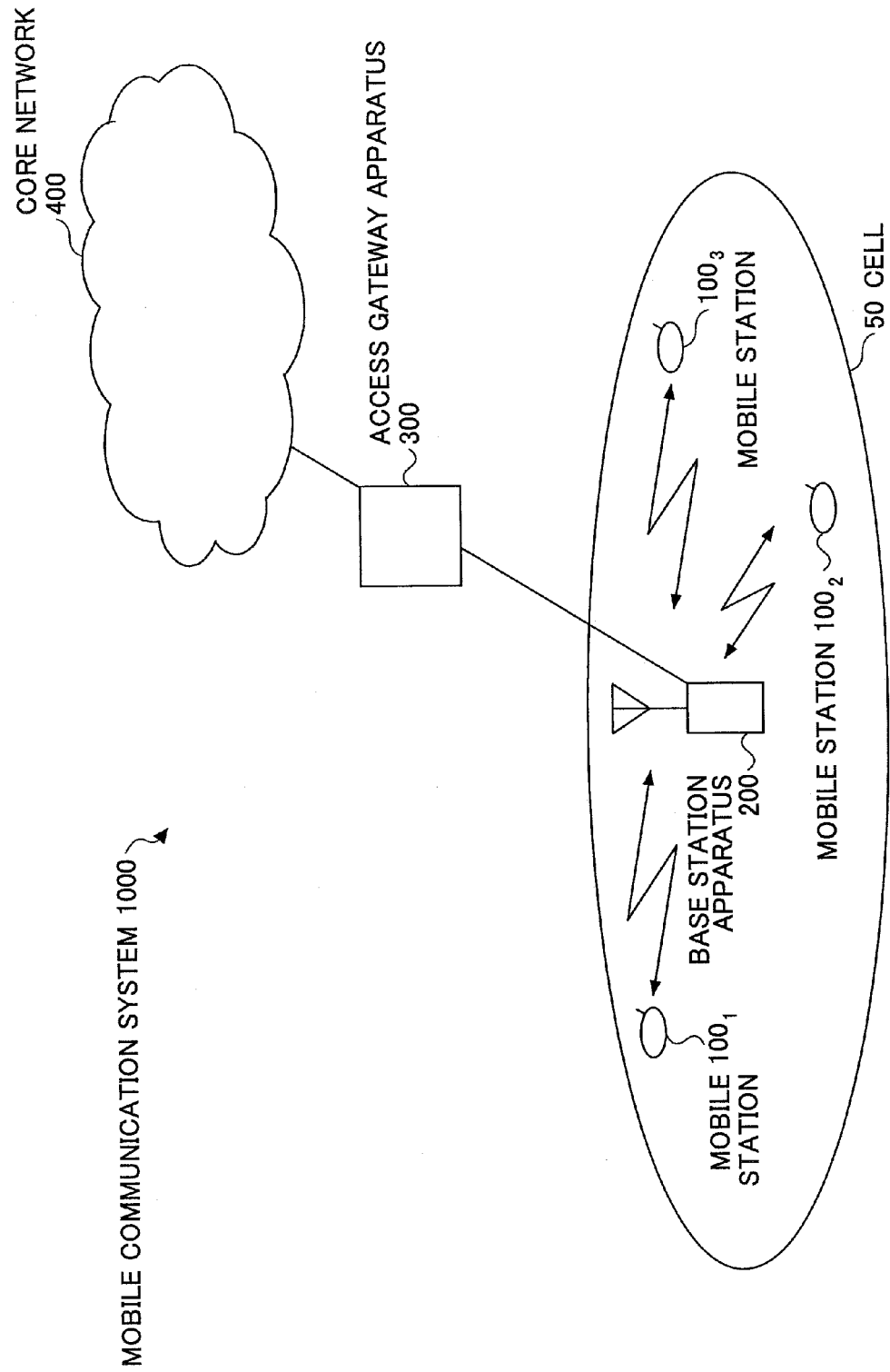
FIG. 1 is a schematic drawing showing a mobile communication system according to an embodiment of the present invention.

FIG. 1 schematically shows a mobile communication system 1000 according to an embodiment of the present invention. As shown in FIG. 1, the mobile communication system 1000, which may be an LTE (Long Term Evolution) system (or may be an Evolved UTRA (Universal Terrestrial Radio Access) and UTRAN (UTRA Network) system or a super 3G system), includes a base station apparatus (eNB: eNode B) 200 and plural mobile stations (user equipment (UE)) $100_n$ ($100_1$, $100_2$, $100_3$, ... $100_n$; n: an integer greater than zero (0)) (hereinafter, the user equipment (UE) may be referred to as a user equipment terminal(s)). The base station apparatus 200 is connected to an upper node station such as an access gateway apparatus or a mobility management node (MME/UPE) 300. The access gateway apparatus 300 is connected to a core network 400. In this case, the user equipment (UE) terminals $100_n$ are in communication with the base station apparatus 200 in a cell 50 based on the LTE system scheme. For explanatory purposes, it is mobile stations that communicate with the base station apparatus. However, more generally, the term user equipment (UE) (terminals) including moving terminals and fixed terminals may also be used as a substitute for the mobile stations.

First Embodiment

Figure 2:
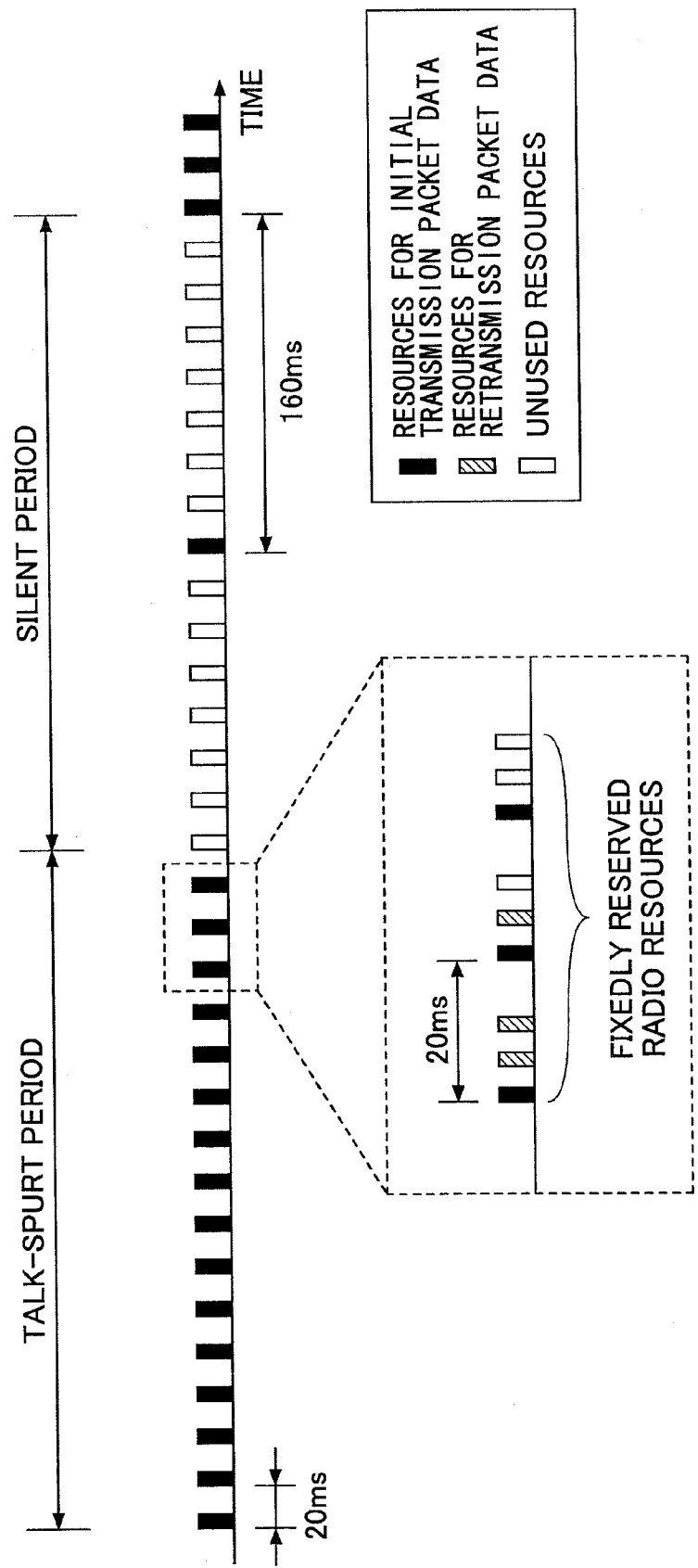
FIG. 2 is a drawing showing a first method of Persistent Scheduling.

FIG. 2 shows a first method of Persistent Scheduling. In FIG. 2, the horizontal axis represents a time axis, and with respect to a certain user to be a target of the Persistent Scheduling, predetermined fixed radio resources are reserved every predetermined frequency (period). In the example in FIG. 2, predetermined radio resources (which may include resource blocks, transport format, transmission power and the like) are repeatedly reserved every 20 ms for a user (user equipment terminal). "A" to perform voice communications or the like. In such a case, typically, a talk-spurt period and a silent period alternately appear as shown in FIG. 2. In the talk-spurt periods, voice packet data are periodically generated, and the voice packet data of the user "A" are transmitted every 20 ms using radio resources reserved in advance. On the other hand, in the silent periods, no voice packet data are generated; however, background noise of the user "A" or the opposite party of the communication may be transmitted at a cycle longer than 20 ms (e.g., at a cycle of 160 ms in this case of FIG. 2). Therefore, in the silent periods, all the radio resources that have been reserved for the user "A" are not always practically used for the user "A". Due to this feature, in the first method, in order to make it possible to improve the effective use of the radio resources, it may be allowed to allocate the radio resources to a user(s) (a user equipment terminal(s)) other than the user "A", the radio resources having been reserved for the user "A" but not having been practically allocated to the user "A". In the FIG. 2, there are provided white resources, which represent unused resources that have not been used for the user "A"; therefore, the unused resources may be allowed to be used for the users other than the user "A".

When the first method is applied, the transmission timings and radio resources are reserved in advance with respect to not only the resources for initial transmission packet data but also the resources for retransmission packet data. Therefore, if the maximum available number of retransmission is allowed only for the user "A", all the resources for initial transmission packet data and the resources for retransmission packet data are collectively reserved for the user "A". For simplification purposes, in the upper timing chart of FIG. 2, the resource for the retransmission packet data are not displayed and only the resources for the initial transmission packet data and the unused resources are displayed. On the other hand, in the lower timing chart of FIG. 2, all of the resources for initial transmission packet data, resources for retransmission packet data, and the unused resources are displayed.

Figure 3:
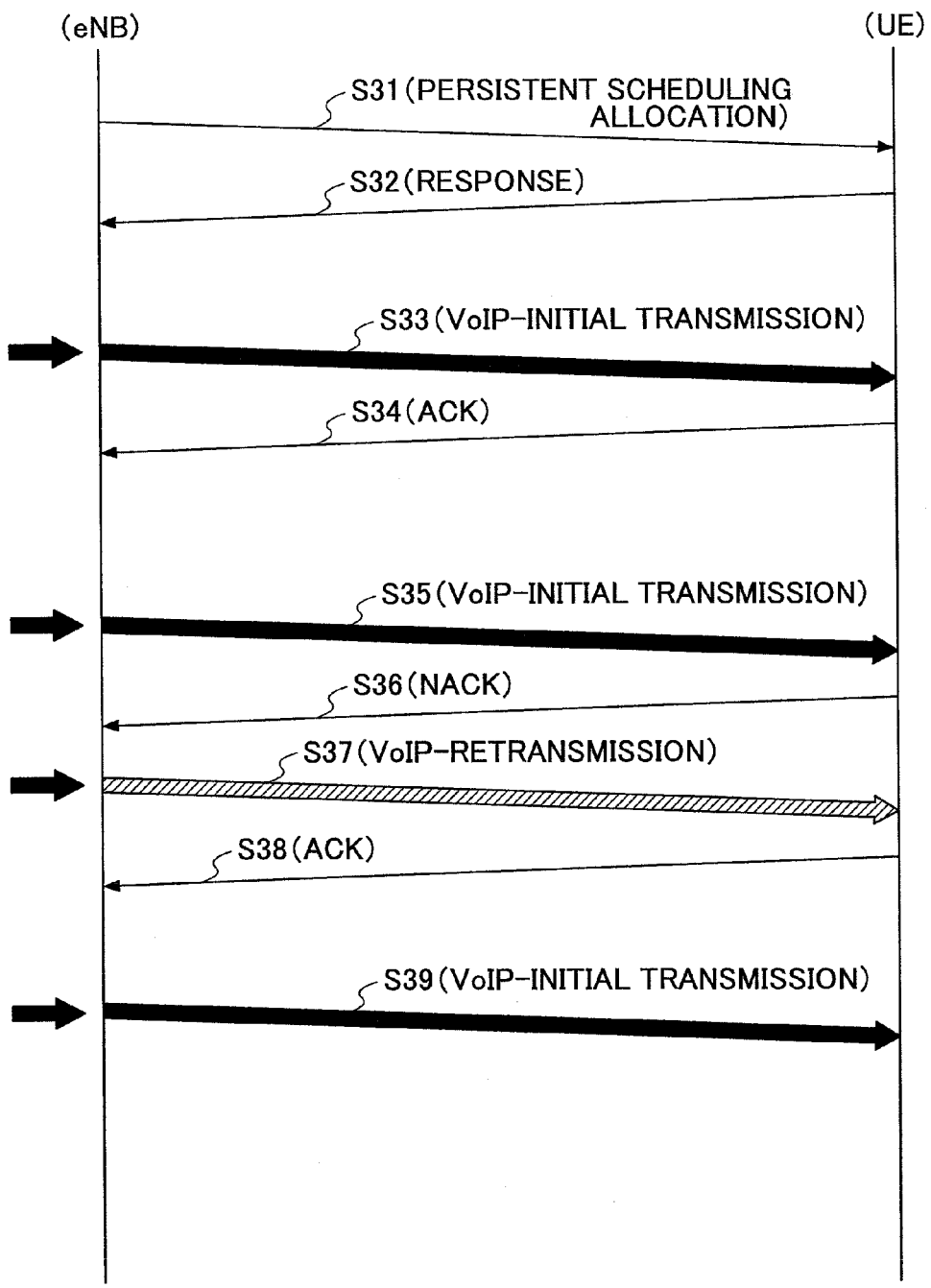
FIG. 3 is a sequence diagram showing an exemplary operation according to the first method.

FIG. 3 is a sequence diagram showing a process of the first method. For explanation purposes, FIG. 3 shows a case where downlink voice packet data (e.g., VoIP) are transmitted. However, obviously, the sequence diagram shown in FIG. 3 according to an embodiment of the present invention may also be applicable to uplink voice packet data. FIG. 3 illustrates a process initiated by a certain user "A" which intends to perform voice communication; and accordingly the base station "eNB" determines that the Persistent Scheduling is to be applied to the voice communication. As shown in FIG. 3, in step S31, the specific contents (such as start timing of the Persistent Scheduling, frequency of allocating the radio resources, transport format to be applied to the radio resources and the like) of the Persistent Scheduling to be applied are reported from the base station to the user equipment (UE) terminal. However, in a case where the specific contents are determined in advance in the system, only starting timing may be reported to the user equipment (UE) terminal.

Next, in step S32, the response to the received report of the start timing of the Persistent Scheduling is transmitted from the user equipment (UE) terminal to the base station apparatus.

In step S33, by using the radio resources having been reserved by the Persistent scheduling, voice packet data of the initial transmission are transmitted from the base station to the user equipment (UE) terminal. In step S34, the user equipment (UE) terminal transmits the acknowledgement information (ACK/NACK) to the base station. As the acknowledgement information, either affirmative response "ACK" or negative response "NACK" is transmitted. In this case, the response "ACK" is transmitted in step S34.

In step S35, additional voice packet data of the initial transmission are transmitted from the base station to the user equipment (UE) terminal. In this case, in step S36, the response "NACK" is transmitted from the user equipment (UE) terminal to the base station.

Next, in step S37, in response to the received response "NACK", the base station retransmits the corresponding additional voice packet data that have been transmitted before to the user equipment (UE) terminal. The radio resources used for this retransmission have been reserved in advance so as to correspond to as many as the maximum available number of the retransmissions in the Persistent Scheduling. When the voice packet data of the retransmission are successfully received, the response "ACK" is returned to the base station in step S38.

In step S39, more additional voice packet data of the initial transmission are transmitted using the reserved radio resources from the base station to the user equipment (UE) terminal, and the same processes as described above are repeated.

As described above, according to the first method of the Persistent Scheduling, the fixed radio resources are reserved for the initial transmission packet data and all the retransmission packet data as well in advance; therefore, the first method may be preferable from the viewpoint of reducing the overhead caused by the signaling of the radio resources.

Second Embodiment

Figure 4:
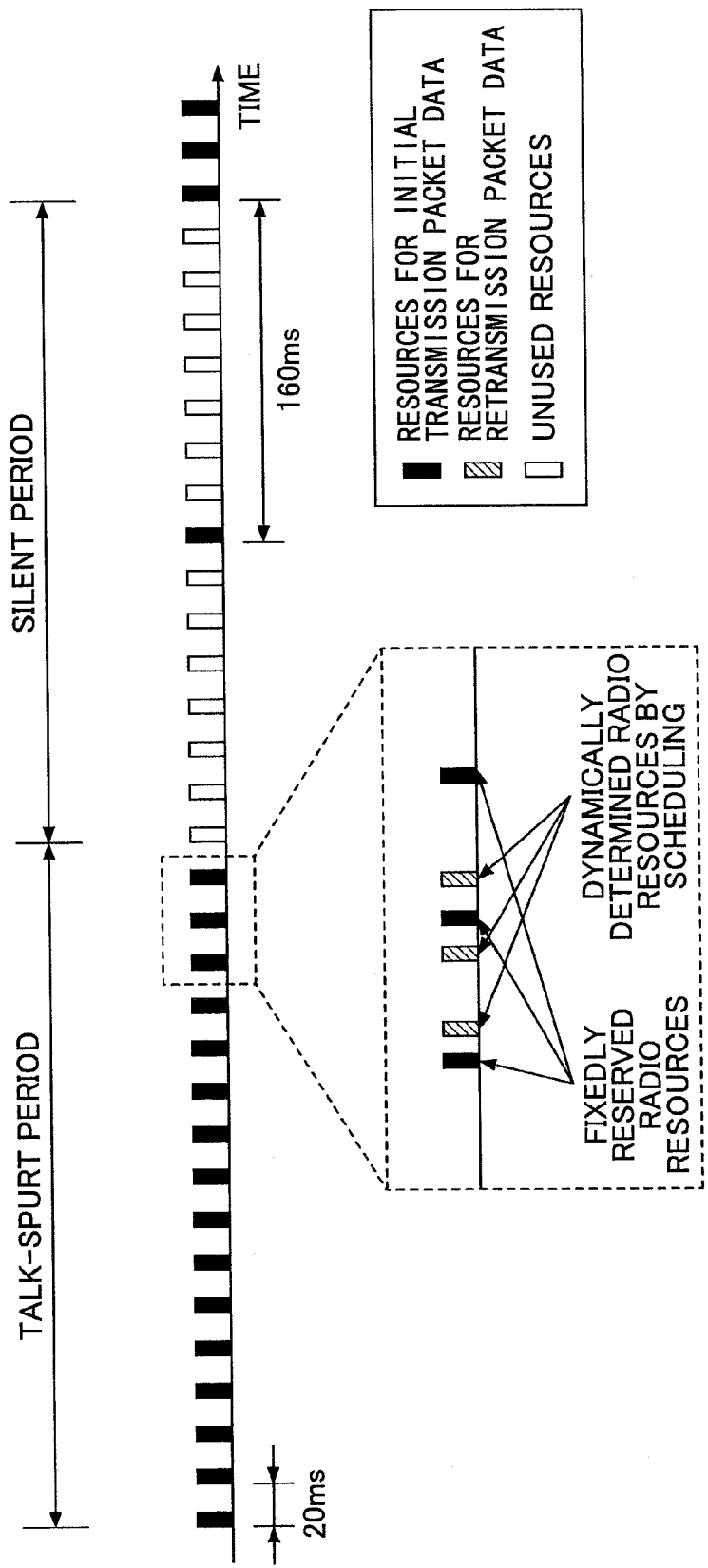
FIG. 4 is a drawing showing a second method of the Persistent Scheduling.

FIG. 4 shows a second method of Persistent Scheduling. The second method is similar to the first method in that the fixed radio resources for the initial transmission packet data are reserved in advance every predetermined frequency (period). However, the second method differs from the first method in that the radio resources for the retransmission packet data are not reserved in advance but are to be dynamically allocated on an as-needed basis. To that end, although the allocation information of the radio resources for the initial transmission packet data is known in advance to the user equipment terminal without a report using a downlink L1/L2 control signal, it is required that the allocation information of the radio resources for the retransmission packet data be dynamically transmitted to the user equipment terminal on an as-needed basis using the downlink L1/L2 control signal.

In other words, with respect to the retransmission packet data, the signaling of the radio resources is performed; therefore it becomes no longer necessary to reserve the radio resources in advance so as to correspond to as many as the maximum available number of the retransmissions in the Persistent Scheduling.

Figure 5:
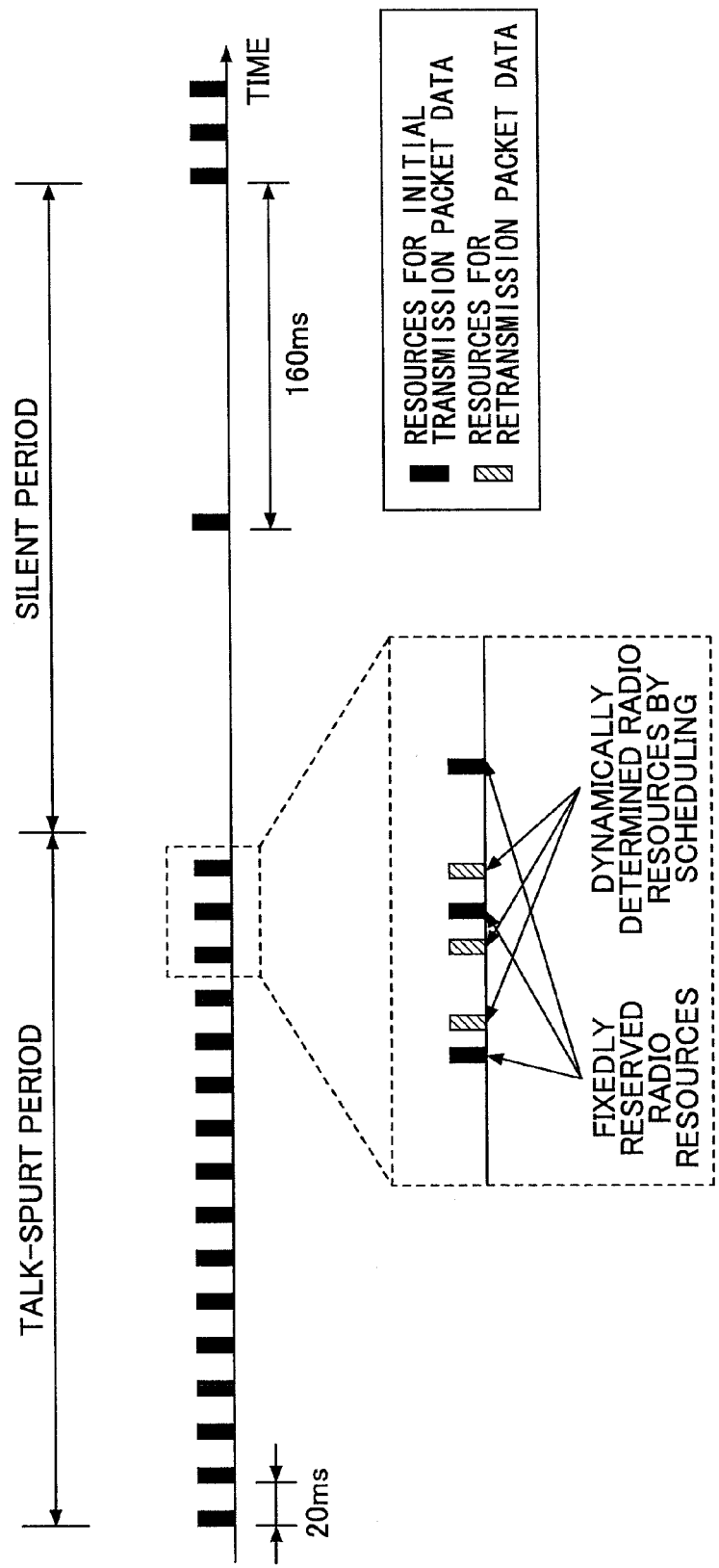
FIG. 5 is a drawing showing a modified second method of the Persistent Scheduling.

FIG. 5 shows a modified example of the second method (a modified second method) of the Persistent Scheduling. The modified second method is similar to the second method of FIG. 4 in that the dynamic scheduling is performed with respect to the retransmission packet data. However, the modified second method differs from the second method of FIG. 4 regarding the frequency of reserving the radio resources in the talk-spurt periods and the silent periods. As shown in the example of FIG. 5, the radio resources are reserved every 20 ms in the talk-spurt period but the radio resources are reserved as infrequently as every 160 ms the silent period. Because of this feature, unlike the case of the example of FIG. 4, in the example of FIG. 5, substantially no unused resources are generated, thereby enabling contributing to the effective use of the radio resources.

Figure 6:
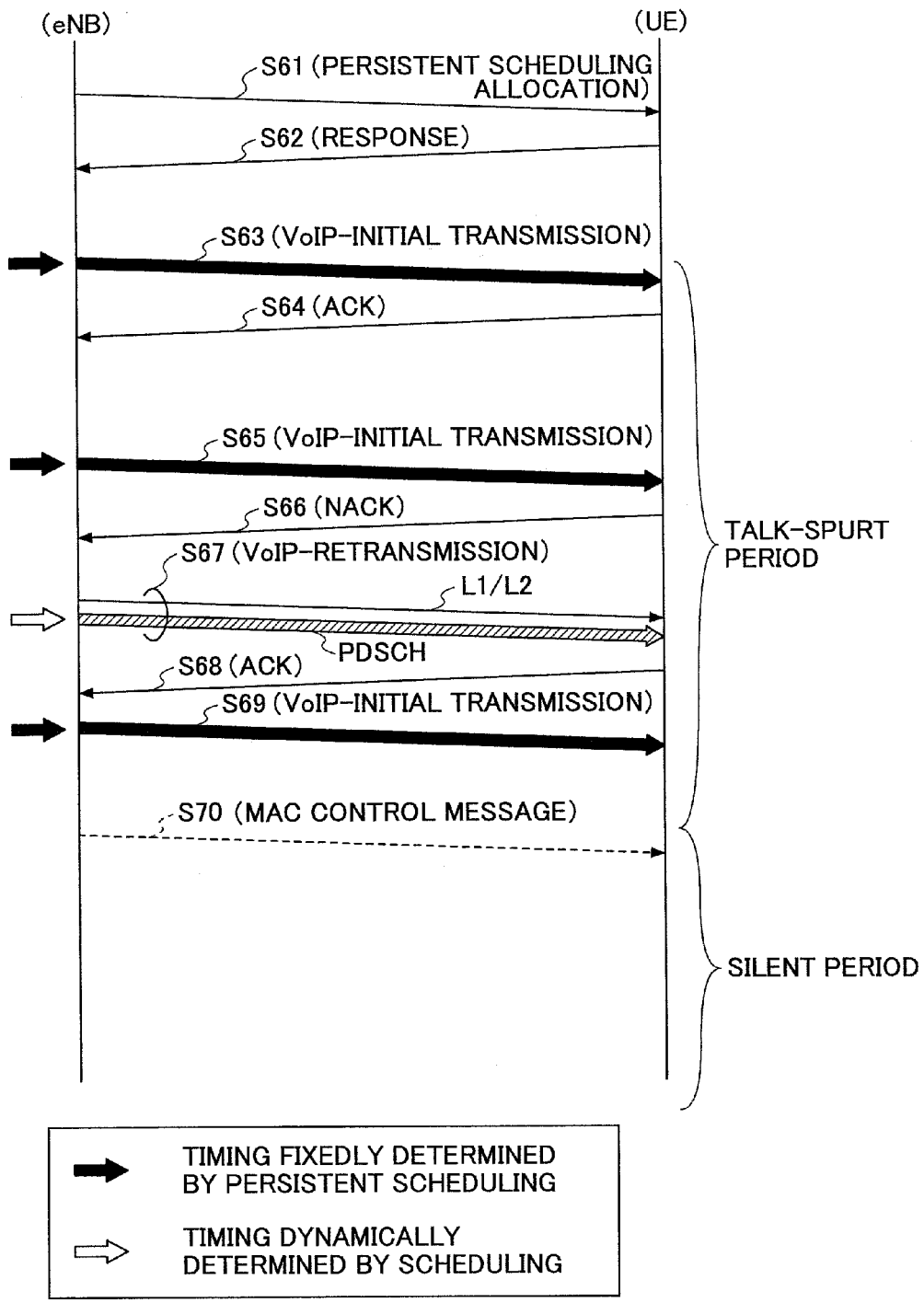
FIG. 6 is a sequence diagram showing an exemplary operation according to the second method.

FIG. 6 is a sequence diagram showing a process of the second method. Similar to the case shown in FIG. 3, first, in step S61, the specific contents (such as start timing of the Persistent Scheduling, frequency of allocating the radio resources, transport format to be applied to the radio resources and the like) of the Persistent Scheduling to be applied are transmitted from the base station to the user equipment (UE) terminal.

Next, in step S62, the response to the received start timing of the Persistent Scheduling is transmitted from the user equipment (UE) terminal to the base station apparatus.

In step S63, by using the radio resources having been reserved by the Persistent scheduling, voice packet data of the initial transmission are transmitted from the base station to the user equipment (UE) terminal. In step S64, the user equipment (UE) terminal transmits the response "ACK" to the base station.

In step S65, additional voice packet data of the initial transmission are transmitted from the base station to the user equipment (UE) terminal. In this case, in step S66, the response "NACK" is transmitted from the user equipment (UE) terminal to the base station.

Next, in step S67, in response to the received response "NACK", the base station retransmits the corresponding additional voice packet data that have been transmitted before to the user equipment (UE) terminal. In this case, the radio resources used for this retransmission packet data, however, are not reserved in advance by the Persistent Scheduling. Namely the radio resources used for this retransmission packet data are determined not by the Persistent Scheduling but by normal Scheduling. The determined contents (radio resources) are reported to the user equipment (UE) terminal using the downlink L1/L2 control signal. The user equipment (UE) terminal decodes the downlink L1/L2 control signal, specifies (determines) to which part of the Physical Downlink Shared Channel (PDSCH) the retransmission packet data are mapped based on the decoded downlink L1/L2 control signal, and extracts the retransmission packet data transmitted to the user equipment (UE) terminal. In the example of FIG. 6, the retransmission packet data are successfully received, and the response "ACK" is returned to the base station in step S68.

In step S69, more additional voice packet data of the initial transmission are transmitted using the reserved radio resources from the base station to the user equipment (UE) terminal.

Then, the same processes as described above are repeated. On the other hand, when the modified second method shown in FIG. 5 is applied, as shown in step S70 of FIG. 6, a report signal indicating a transition between the talk-spurt period and the silent period is transmitted to the user equipment (UE) terminal. In the example of FIG. 6, the report signal is transmitted as a MAC control message. However, the report signal may be transmitted as the downlink L1/L2 control signal. Further, it may be technically possible to transmit the report signal as L3 control information. However, from the viewpoint of the necessity of promptly reporting the transition between the talk-spurt period and the silent period, it may be preferable to transmit the report signal as the MAC control message or the downlink L1/L2 control signal. Further, the report signal may be transmitted along with the initial voice packet data or retransmission voice packet data or may be transmitted at a timing separated from the timing to transmit the voice packet data. The timing of the transition between the talk-spurt period and the silent period may be determined based on, for example, an amount of packet data in a downlink transmission buffer. When the modified second method (of FIG. 5) is applied, in the silent periods, data such as background noise are transmitted to the user equipment (UE) terminal using the radio resources reserved only every cycle (period) longer than that in the talk-spurt periods. As described above, the methods are applicable to the uplink communication as well. In this case, the timing of the transition between the talk-spurt period and the silent period may be reported to the base station based on, for example, an amount of packet data in an uplink transmission buffer. In FIG. 6, a case is described where only a signal (in this case the MAC control message) indicating the transition from the talk-spurt period to the silent period is transmitted. However, the report signal indicating the transition from the silent period to the talk-spurt period may also be transmitted using the MAC control message or the like.

According the second and the modified second methods, it is not necessary to reserve the radio resources in advance so as to correspond to as many as the maximum available number of the retransmissions in the Persistent Scheduling; therefore, it may become possible to achieve effective use of the radio resources used for the initial transmission packet data.

Third Embodiment

Figure 7:
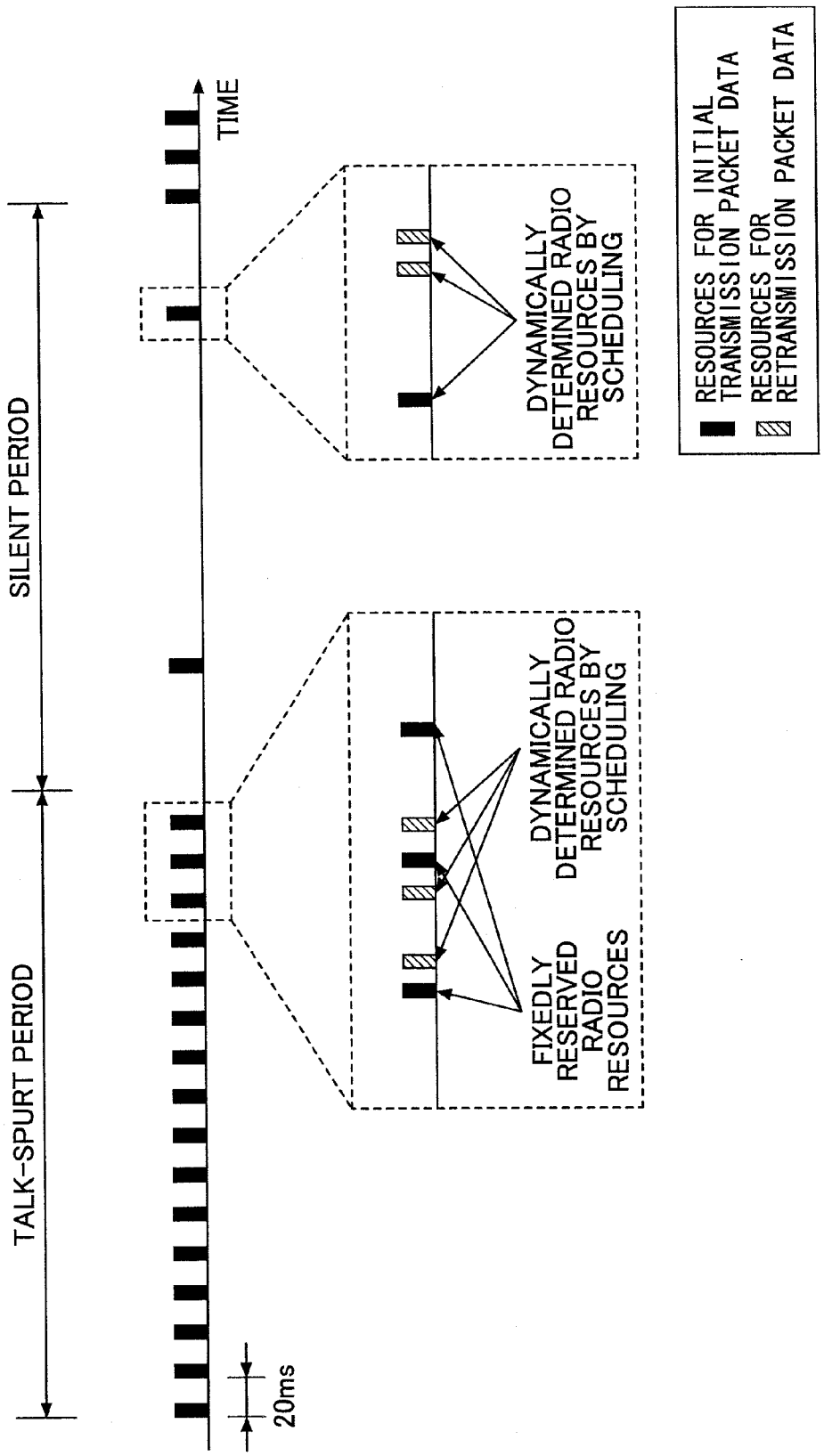
FIG. 7 is a drawing showing a third method of the Persistent Scheduling.

FIG. 7 shows a third method of Persistent Scheduling. The third method is similar to the first method in that, in the talk-spurt periods, the fixed radio resources for the initial transmission packet data are reserved in advance every predetermined frequency (period). Further, the third method is similar to the second method in that, in both the talk-spurt periods and the silent periods, the radio resources for the retransmission packet data are not reserved in advance but dynamically allocated on an as-needed basis. However, the third method differs from any other method described above in that, in the silent periods, even the radio resources for the initial transmission packet data are not reserved in advance but dynamically allocated on an as-needed basis. In other words, in the third method of the Persistent Scheduling, only the radio resources for the initial transmission packet data to be transmitted in the talk-spurt periods are reserved in advance, but the radio resources for the retransmission packet data to be transmitted in the talk-spurt periods and the radio resources for all the packet data to be transmitted in the silent periods are not determined by the Persistent Scheduling but dynamically determined by the normal Scheduling.

Figure 8:
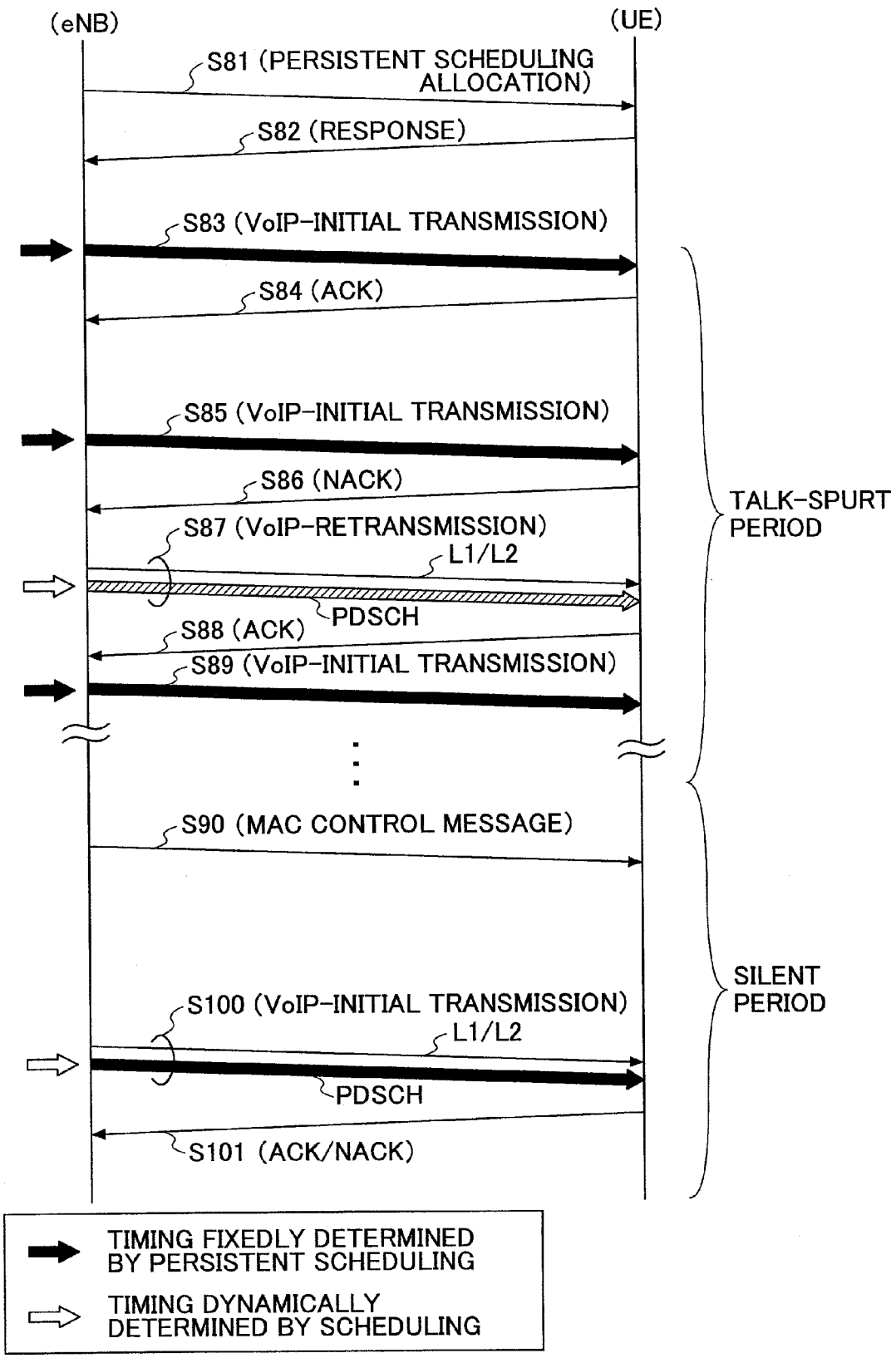
FIG. 8 is a sequence diagram showing an exemplary operation according to the third method.

FIG. 8 is a sequence diagram showing a process of the third method. Similar to the case shown in FIG. 6, first, in step S81, the specific contents (such as start timing of the Persistent Scheduling, frequency of allocating the radio resources, transport format to be applied to the radio resources and the like) of the Persistent Scheduling to be applied are transmitted from the base station to the user equipment (UE) terminal.

Next, in step S82, the response to the received specific contents of the start timing of the Persistent Scheduling is transmitted from the user equipment (UE) terminal to the base station apparatus.

In step S83, by using the radio resources having been reserved by the Persistent scheduling, voice packet data of the initial transmission are transmitted from the base station to the user equipment (UE) terminal. In step S84, the user equipment (UE) terminal responses the response "ACK" to the base station.

In step S85, additional voice packet data of the initial transmission are transmitted from the base station to the user equipment (UE) terminal. In the case of FIG. 8, in step S86, the response "NACK" is transmitted from the user equipment (UE) terminal to the base station.

Next, in step S87, in response to the received response "NACK", the base station retransmits the corresponding additional voice packet data that have been transmitted before to the user equipment (UE) terminal. The radio resources used for this retransmission packet data, however, are not reserved in advance by the Persistent Scheduling. Namely the radio resources used for this retransmission packet data are determined not by the Persistent Scheduling but by normal Scheduling. The determined contents (radio resources) are reported to the user equipment (UE) terminal using the downlink L1/L2 control signal. The user equipment (UE) terminal decodes the downlink L1/L2 control signal, specifies (determines) to which part of the Physical Downlink Shared Channel (PDSCH) the retransmission packet data are mapped based on the decoded downlink L1/L2 control signal, and extracts the retransmission packet data transmitted to the user equipment (UE) terminal. In the example of FIG. 8, the retransmission packet data are successfully received, and the response "ACK" is returned to the base station in step S88.

In step S89, more additional voice packet data of the initial transmission are transmitted using the reserved radio resources from the base station to the user equipment (UE) terminal.

As shown in step S90 in FIG. 8, the report signal indicating the transition from the talk-spurt period to the silent period is transmitted to the user equipment (UE) terminal. In the example of FIG. 8, the report signal is transmitted as a MAC control message. However, the report signal may be transmitted as the downlink L1/L2 control signal. When this method is applied to the uplink communication, the timing of the transition between the talk-spurt period and the silent period may be reported to the base station based on, for example, an amount of packet data in an uplink transmission buffer.

In the silent periods, no radio resources are reserved in advance for the initial transmission packet data and the retransmission packet data; and such radio resources are dynamically allocated by a (normal) Scheduling other than the Persistent Scheduling. By using such radio resources, the data such as the background noise are transmitted to the user equipment (UE) terminal.

In step S100 of FIG. 8, in response to the necessity of transmitting such data as the background noise to the opposite party of the communication, the radio resources for transmitting the data are dynamically determined. Determined contents (radio resources) are reported to the user equipment (UE) terminal using the downlink L1/L2 control signal. The user equipment (UE) terminal decodes the received downlink L1/L2 control signal, specifies (determines) to which part of the Physical Downlink Shared Channel (PDSCH) the packet data transmitted to the user equipment (UE) terminal are mapped based on the decoded downlink L1/L2 control signal, and extracts the packet data from the Physical Downlink Shared Channel (PDSCH). Then, when it becomes necessary to transmit the initial packet data or retransmit the packet data, the radio resources for the transmission are allocated by dynamic Scheduling; and the Signaling is performed using the downlink L1/L2 control signal to transmit the packet data to the user equipment (UE) terminal.

In FIG. 8, a case is described where only the report signal indicating the transition from the talk-spurt period to the silent period is reported. However, in a case where the report signal indicating the transition from the silent period to the talk-spurt period may also be reported using the MAC control message or the like.

According to the third method of the Persistent Scheduling, the radio resources for the retransmission packet data are not reserved in advance; therefore, it is no longer necessary to reserve many radio resources in advance so as to correspond to as many as the maximum available number of the retransmissions in the Persistent Scheduling. Further, in the silent periods, it is not necessary to reserve in advance the radio resource for either the retransmission packet data or the initial transmission packet data. However, in this third method, it becomes necessary to perform the Signaling to dynamically allocate the radio resources for all the packet data other than the initial transmission packet data in the talk-spurt periods, (namely, the retransmission packet data in both talk-spurt and silent periods and the initial transmission packet data in the silent periods). Because of this feature, Signaling overhead may be more increased compared with the first method and the second method.

On the other hand, the frequency of the packet data transmission by the user (user equipment terminal) in the silent periods is much less than that in the talk-spurt periods, which ratio is about 1:8 in the above embodiments. Therefore, even if the dynamic Scheduling is performed in the silent periods, the frequency of the dynamic Scheduling may be estimated to be very low; and the increase of the Signaling overhead is estimated to be substantially the same level as in the modified second method (in FIG. 5). In other words, the overhead caused by the Persistent Scheduling may be most effectively reduced when the Persistent Scheduling is performed during the talk-spurt periods where the packet data to be transmitted are most frequently generated. According to the third method of the Persistent Scheduling, by arranging to reserve in advance the radio resources for the initial transmission packet data which are mostly generated in the talk-spurt periods and dynamically allocate the radio resources to the other packet data on an as-needed basis, it may becomes possible to reduce the overhead and effectively use the radio resource simultaneously.

Fourth Embodiment

In the first method (in FIG. 2) and the second method (in FIG. 4), the radio resources are reserved every predetermined period (cycle) regardless of whether the radio resources are provided in the talk-spurt period or the silent period. Further, in the first method, the radio resources for both the initial transmission packet data and the retransmission packet data are reserved in advance for a specific user; and in the second method, the radio resources for only the initial transmission packet data are reserved in advance for the specific user. For example, a case is considered where the resource blocks "X" and "Y" are reserved for the users "A" and "B", respectively, to be targets of the Persistent Scheduling every 20 ms. The reserved resource blocks "X" are allocated to the user "A" in the talk-spurt periods. However when the resource blocks "X" are not allocated to the user "A" in the silent periods, the resource blocks "X" in the silent periods may be allocated to a user "C" who is a user other than user "A". This user "C" may be dynamically determined by the Scheduling other than the Persistent Scheduling. In the same manner, the reserved resource blocks "Y" are allocated to the user "B" in the talk-spurt periods. However, when the resource blocks "Y" are not allocated to the user "B" in the silent periods, the resource blocks "Y" in the silent periods may be allocated to the user "C" who is a user other than user "B". From the viewpoint of the effective use of the resources, in the silent periods, it may be preferable to allocate the resource blocks "X" or "Y" to the user "C" who is a user other than user "A" or "B", respectively. However, when such dynamic allocation is performed during the Persistent Scheduling, the process may become more complicated.

Meanwhile, it is expected that the ratio of the talk-spurt period corresponding to a speaking period to the silent period corresponding to a not-speaking or hearing period becomes 1:1 from the statistical point of view. Further, from the viewpoint of the resource blocks "X" and "Y", the resource blocks "X" are more likely to be allocated to the user "A" at the probability of about 50% and more likely to be allocated to the user "C" at the probability of about 50% as well. In the same manner, the resource blocks "Y" are likely to be allocated to the user "B" at the probability of about 50% and more likely to be allocated to the user "C" at the probability of about 50%. Therefore, if the timings when the packet data of the user "A" are generated do not overlap the timings when the packet data of the user "B" are generated, theoretically, the number of resource blocks required to be reserved in advance becomes one (1). In order to avoid the overlap of the timings, not only the users "A" and "B" but also plural users to be involved in the Persistent Scheduling are required to be considered. The more number of users, the more expected it is that the timings of the generated packet data are more distributed in time domain. In a fourth embodiment of the present invention, based on the above consideration, the dynamic allocation may be avoided.

According to the fourth embodiment of the present invention, a case is considered where, for example, six (6) resource blocks "P", "Q", "R", "S", "T", and "U" are provided for ten (10) users to be the targets of the Persistent Scheduling. In this case, each user decodes each of the resource blocks "P" through "U" and obtains meaningful information from any one of the resource blocks (performs the blind detection). In this case, five (5) resource blocks may be theoretically sufficient when the number of the users is ten (10) as in this case. However, since there may be a possibility that the timings of the generated packet data of those ten (10) users are not fully separated from each other, it is preferable to provide an additional certain margin (one resource block) in such a case.

According to this method, with respect to a user to be a target of the Persistent Scheduling, by providing plural candidate radio resources and performing the blind detection in the user equipment (UE) terminal, it may become possible to reduce the Signaling overhead and effectively use the radio resource.

In the following, a base station apparatus and a user equipment (UE) terminal to be used to achieve the first through the fourth embodiments of the present invention are described.

Base Station Apparatus

Figure 9:
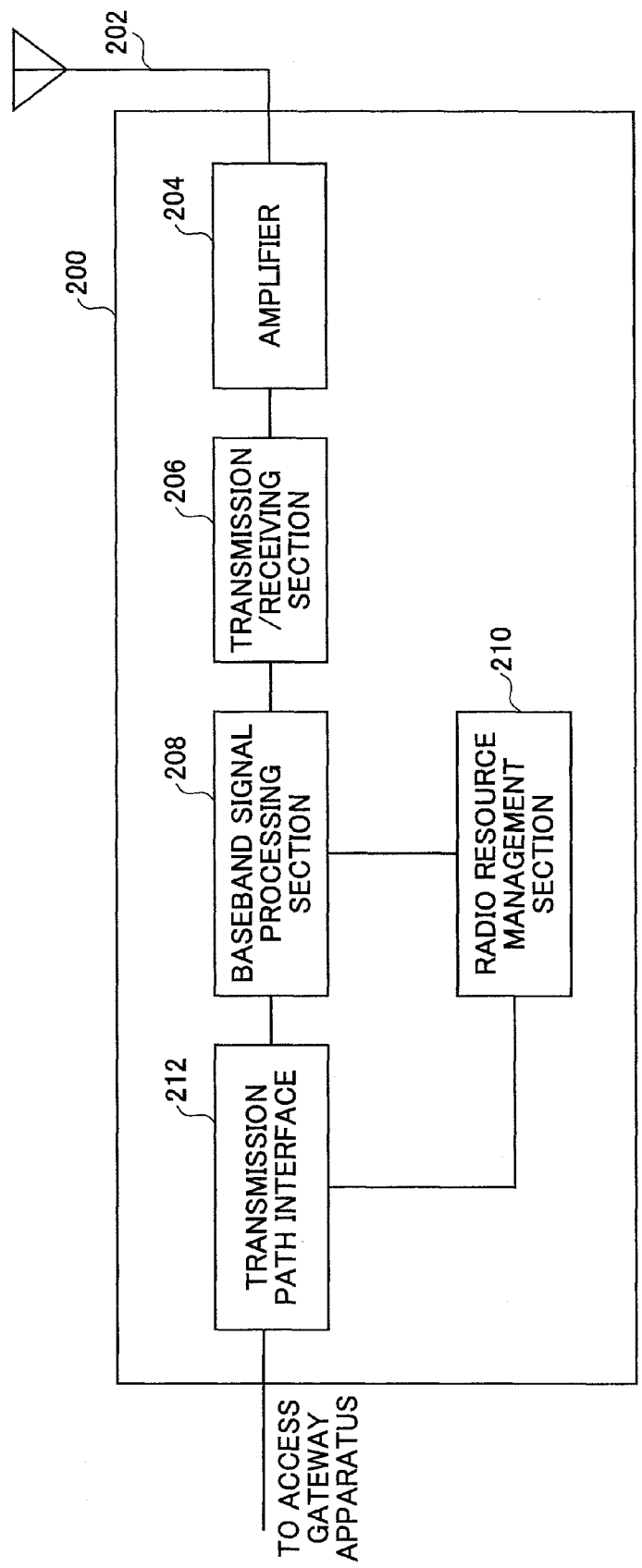
FIG. 9 is a partial block diagram of a base station apparatus according to an embodiment of the present invention.

FIG. 9 shows an exemplary configuration of the base station apparatus 200 (in FIG. 1) according to an embodiment of the present invention. As shown in FIG. 9, the base station apparatus 200 includes a transmission/receiving antenna 202, an amplifier 204, a transmission/receiving section 206, a baseband signal processing section 208, a radio resource management section 210, and a transmission path interface section 212. For explanatory purposes, a downlink process (1) and an uplink process (2) are separately descried.

In the downlink process (1) where user data are transmitted from the base station apparatus 200 to the mobile station 100$_n$, the user data are transmitted from a higher station (e.g., the access gateway apparatus 300) located at a higher level than the base station apparatus 200 to the baseband signal processing section 208 via the transmission path interface section 212. In the baseband signal processing section 208, segmentation and concatenation of the user data, an RLC-layer transmission process such as RLC (Radio Link Control) retransmission control, MAC (Medium Access Control) retransmission control such as an HARQ (Hybrid Automatic Repeat reQuest) transmission process, a scheduling process, a transport format selection process, a channel coding process, and an IFFT (Inverse Fast Fourier Transform) process are performed; and the signal processed in the baseband signal processing section 208 is transmitted to the transmission/receiving section 206. Further, with respect to a signal of a Physical Downlink Control Channel (PDCCH) which is a downlink control channel (DL-CCH), the transmission processes such as the channel coding, the IFFT and the like are performed; and the thus-processed signal is transmitted to the transmission/receiving section 206. In the transmission/receiving section 206, a frequency conversion process is performed so that the baseband signal output from the baseband signal processing section 208 is converted into a signal in a radio-frequency band. Then the thus-converted signal is amplified by the amplifier 204 and transmitted via the transmission/receiving antenna 202.

On the other hand, in the uplink process (2) where data are transmitted from the mobile station 100$_n$ to the base station apparatus 200, a signal in the radio frequency is received by the transmission/receiving antenna 202, amplified by the amplifier 204, frequency-converted by the transmission/receiving section 206, and input into the baseband signal processing section 208. In the baseband signal processing section 208, with respect the user data in the input baseband signal, an FFT (Fast Fourier Transform) process, an error correction decoding process, a reception process of the MAC retransmission control, and a reception process of the RLC layer data are performed; and the thus-processed signal is transmitted to the access gateway apparatus 300 via the transmission path interface section 212.

The radio resource management section 210 performs call processes such as setting and releasing a communication channel, management of the base station apparatus 200, and management of radio resources. The radio resource management section 210 determines whether the Persistent Scheduling is to be performed, and further determines, when determined that the Persistent Scheduling is to be performed, which of the above first through third methods is to be performed, and manages radio resources and the like that are reserved in advance. When the Persistent Scheduling is performed while the talk-spurt period and the silent period are to be distinguished (i.e., in the second or the third method), it is necessary to report the timings of switching between the talk-spurt period and the silent period to the user equipment (UE) terminal. Whether the switching is required may be determined based on the amount of packet data in the transmission buffer. When the switching is reported using the MAC control message, the occurrence of the switching event is reported to a MAC processing section 2082 (see FIG. 10). On the other hand, when the switching is reported using the L1/L2 control signal, the occurrence of the switching event is reported to a layer 1 processing section 2081 (see FIG. 10).

Figure 10:
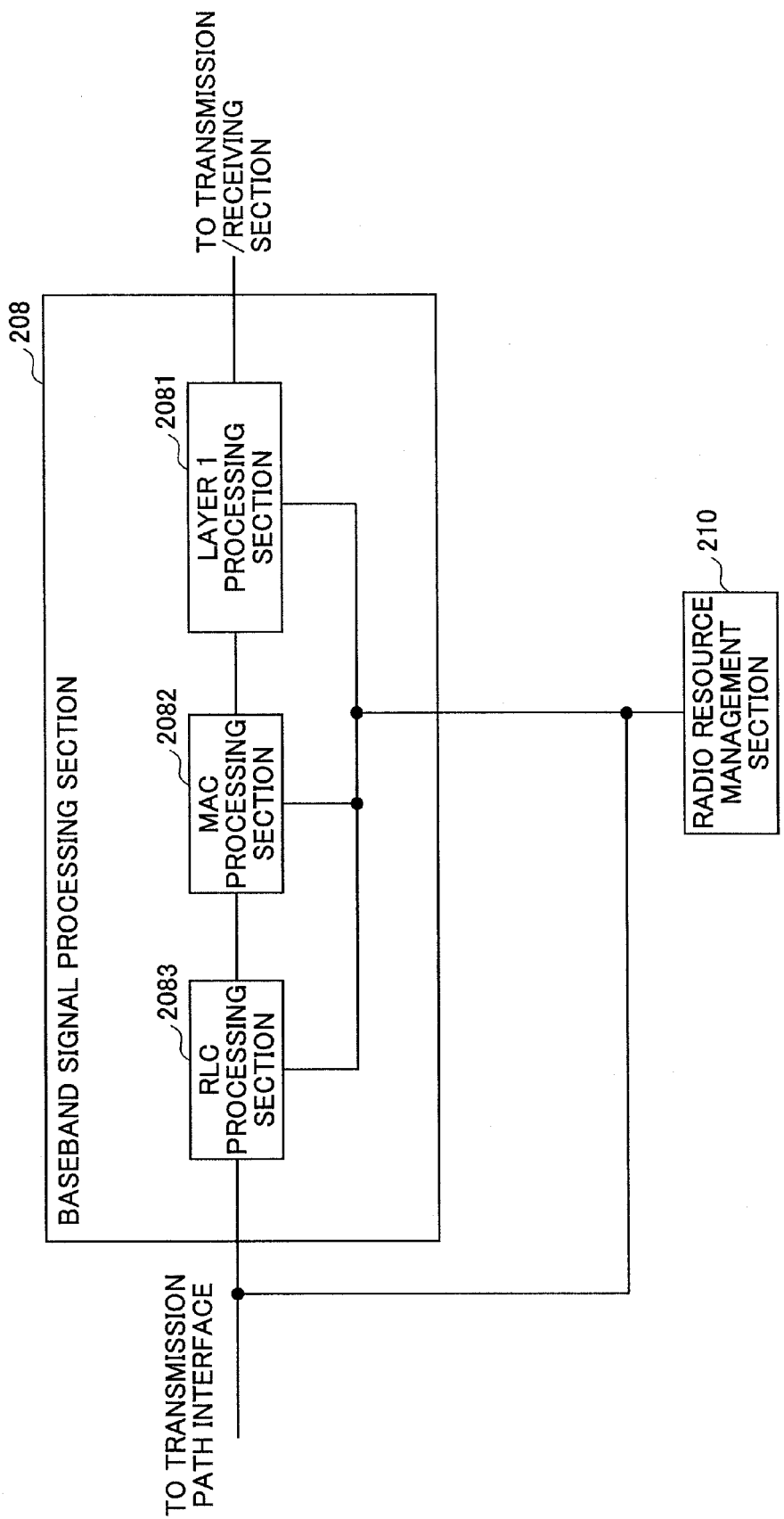
FIG. 10 is a partial block diagram of a baseband signal processing section of the base station apparatus of FIG. 9.

FIG. 10 illustrates an exemplary configuration of the baseband signal processing section 208.

As shown in FIG. 10, the baseband signal processing section 208 includes the layer 1 processing section 2081, the MAC processing section 2082 and an RLC processing section 2083.

In the RLC processing section 2083, with respect to the downlink packet data, the RLC-layer transmission process such the segmentation and concatenation and the transmission process of the RLC retransmission control data are performed. Further, in the RLC processing section 2083, with respect to the uplink packet data, the RLC-layer reception process such the segmentation and concatenation and the reception process of the RLC retransmission control data are performed.

The MAC processing section 2082 performs the MAC retransmission control of the downlink user data such as the HARQ transmission process, the scheduling process, the transport format selection process, and a frequency resources allocation process. In this case, the scheduling process refers to a process of selecting a mobile station that receives user data using the downlink shared channel (DL-SCH) of a certain sub-frame. The transport format selection process refers to a process of determining the modulation scheme, the coding rate, and the data size of the user data received by the mobile station selected in the scheduling process. The determination of the modulation scheme, coding rate, and data size may be performed base on, for example, a value of CQI (Channel Quality Indicator) reported from mobile stations in uplink. The frequency resources allocation process refers to a process of determining resource blocks to be used for the user data received by the mobile station selected in the scheduling process. The determination of the resource blocks may be performed based on, for example, the value of CQI reported from mobile stations in uplink. Further, the MAC processing section 2082 reports the user ID of a user and the information of the transport format of the data of the user (user data) to the layer 1 processing section 2081, the user being in communication using the Physical Downlink Shared Channel (PDSCH) determined in the above various processes (i.e., the scheduling process, the transport format selection process, and the frequency resources allocation process).

When the occurrence of the switching event is reported from the radio resource management section 210, the MAC processing section 2082 generates the MAC control message representing the switching event and transmits the generated MAC control message to the layer 1 processing section 2081, so that the generated MAC control message can be transmitted to the user equipment (UE) terminal.

Further, the MAC processing section 2082 performs the reception process of the MAC retransmission control, the scheduling process, the transport format selection process, and the frequency resources allocation process with respect to the uplink user data. In this case, the scheduling process refers to a process of selecting a mobile station that transmits the user data using a shared channel in a certain sub-frame. The transport format selection process refers to a process of determining the modulation scheme, the coding rate, the data size of the user data transmitted by the mobile station selected in the scheduling process. The determination of the modulation scheme, coding rate, and data size may be performed base on, for example, a value of SIR (Signal-to-Interference power Ratio) of a Sounding reference signal transmitted from the mobile station in uplink. The frequency resources allocation process refers to a process of determining resource blocks to be used for the transmission of the user data transmitted by the mobile station selected in the scheduling process. The determination of the resource blocks may be performed based on, for example, the value of the SIR of the Sounding reference signal transmitted from the mobile station in uplink. Further, the MAC processing section 2082 reports the user ID of the user and the information of the transport format of the data of the user (user data) to the layer 1 processing section 2081, the user being in communication using the Physical Uplink Shared Channel (PUSCH) determined in the above various processes (i.e., the scheduling process, the transport format selection process, and the frequency resources allocation process).

The layer 1 processing section 2081 performs the channel coding and the IFFT process with respect to the data transmitted in downlink and the channel decoding, the FFT process and the like with respect to the data received in uplink. In this case, the data transmitted (in downlink) and the data received (in uplink) include, for example, the IP packet data transmitted/received by Web browsing, FTP (File Transfer Protocol), Voice packet data (VoIP) and the like and a control signal for the process of RRC (Radio Resource Control). Further, the name of the user data as a logical channel may be, for example, a DTCH (Dedicated Traffic Channel) or DCCH (Dedicated Control Channel).

The layer 1 processing section 2081 receives the Downlink Scheduling Information (including the user ID of the user to perform communications using the Physical Downlink Shared Channel (PDSCH) and the information of the transport format of the user data) and the Uplink Scheduling Grant (including the user ID of the user to perform communications using the Physical Uplink Shared Channel (PUSCH) and the information of the transport format of the user data) from the MAC processing section 2082. Further, the layer 1 processing section 2081 performs the transmission process such as the channel coding and the IFFT process with respect to the received Downlink Scheduling Information and the Uplink Scheduling Grant. The Scheduling information for downlink and for uplink is mapped to the Physical Downlink Control Channel (PDCCH) which is a downlink control channel (DL-CCH).

When the occurrence of the event indicating the switching between the talk-spurt period and the silent period is reported from the radio resource management section 210, the layer 1 processing section 2081 generates the downlink L1/L2 control signal including the information item indicating the switching, so that the event indicating the switching can be reported to the user equipment (UE) terminal.

User Equipment Terminal

Figure 11:
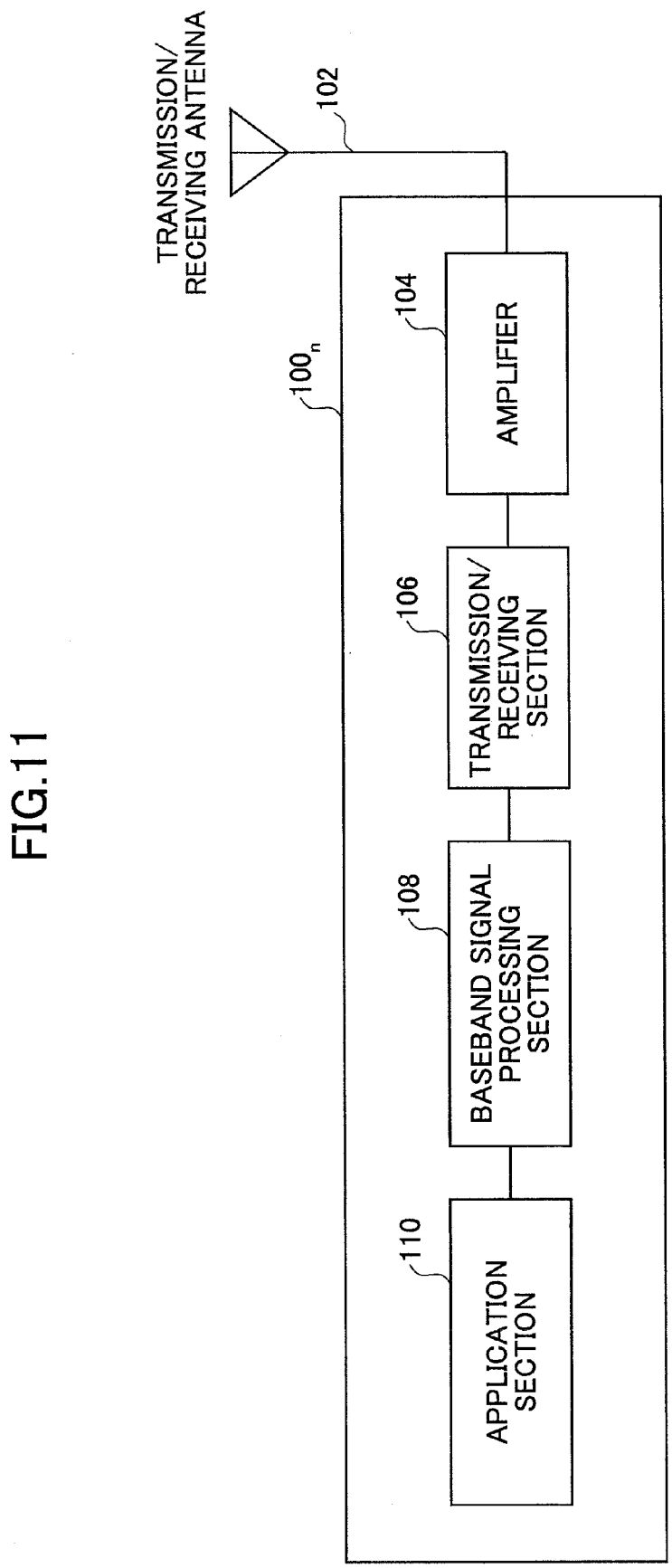
FIG. 11 is a partial block diagram of a user equipment terminal according to an embodiment of the present invention.

FIG. 11 shows an exemplary configuration of the mobile station (user equipment (UE) terminal) 100$_n$ according to an embodiment of the present invention. As shown in FIG. 11, the mobile station 100$_n$ includes a transmission/receiving antenna 102, an amplifier 104, a transmission/receiving section 106, a baseband signal processing section 108, and an application section 110.

With respect to the downlink data, a radio-frequency signal received by the transmission/receiving antenna 102 is amplified by the amplifier 104 and frequency-converted into a baseband signal by the transmission/receiving section 106. With respect to the baseband signal, the baseband signal processing section 108 performs the FFT process, the error correction decoding process, a reception process of retransmission control and the like. The downlink user data included in the downlink data are transmitted to the application section 110. The application section 110 performs processes regarding a layer higher than the Physical layer and the MAC layer. Further, the broadcast information included in the downlink data is also transmitted to the application section 110.

On the other hand, the uplink user data are input (transmitted) from the application section 110 to the baseband signal processing section 108. The baseband signal processing section 108 performs the transmission process of the retransmission control (HARQ), the channel coding process, the IFFT process and the like on the user data and transmits the processed user data (baseband signal) to the transmission/receiving section 106. The transmission/receiving section 106 performs a frequency-conversion process converting the baseband signal output from the baseband signal processing section 108 into a signal in a radio-frequency band. Then the converted signal in the radio-frequency band is amplified by the amplifier 104 and transmitted via the transmission/receiving antenna 102.

Figure 12:
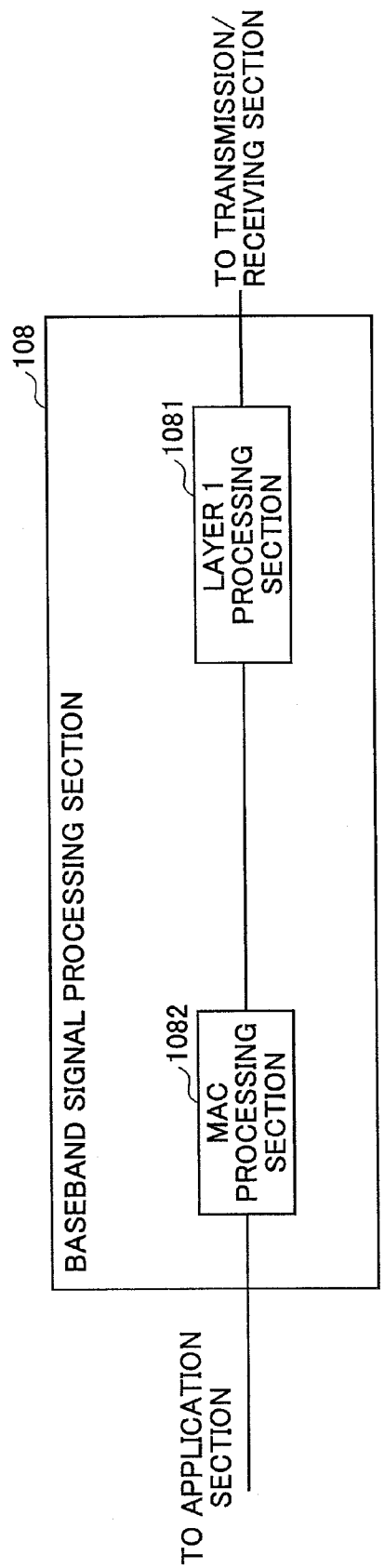
FIG. 12 is a partial block diagram of a baseband signal processing section of the user equipment terminal of FIG. 11.

FIG. 12 shows an exemplary configuration of the baseband signal processing section 108. As shown in FIG. 12, the baseband signal processing section 108 includes a layer 1 processing section 1081 and a MAC processing section 1082.

The layer 1 processing section 1081 generally receives the downlink L1/L2 signal, performs the demodulation process and the decoding process on the received downlink L1/L2 signal, and transmits the demodulated and the decoded result (signal) to the MAC processing section 1082. When the Persistent Scheduling is preformed, the signal is received using the downlink resources that have been reserved in advance.

To transmit the user data in uplink using a certain sub-frame, the layer 1 processing section 1081 first receives the user data from the MAC processing section 1082. Then, with respect to the user data, the layer 1 processing section 1081 performs processes such as the coding process, the data modulation process, a DFT (Discrete Fourier Transformation) process, a sub-carrier mapping process, the IFFT process and the like, converts the processed user data into a baseband signal, and transmits the baseband signal to the transmission/receiving section 106. When the Persistent Scheduling is performed, the signal is transmitted using the uplink radio resources that have been reserved in advance. Further, when the allocation of the resources in the Persistent Scheduling is performed based on the method according to the fourth embodiment of the present invention is performed, the demodulation process and the decoding process are performed on all the candidate radio resources and meaningful information is obtained from any of the candidate radio resources.

Upon transmitting the control channel in uplink using a certain sub-frame, with respect to the control signal (such as the CQI or acknowledgement information) to be transmitted, the layer 1 processing section 1081 performs processes such as the channel coding process, the data modulation process, the DFT process, the sub-carrier mapping process, the IFFT process and the like to convert the signal into a baseband signal, so as to transmit the converted baseband signal to the transmission/receiving section 106.

The MAC processing section 1082 performs the reception processes of the MAC retransmission control of the downlink user data based on the decoding result of the Physical Downlink Control Channel (PDCCH) received from the layer 1 processing section 1081. Namely when it is reported that, in downlink, the communications using the shared channel are to be performed, the MAC processing section 1082 performs the decoding on the received user data and the CRC (Cyclic Redundancy Check) to determine whether the signal of the user data has an error. Then, based on a result of the CRC, the MAC processing section 1082 generates the acknowledgement information and reports the generated acknowledgement information to the layer 1 processing section 1081. When the result of the CRC is affirmative, the MAC processing section 1082 generates a affirmative response signal "ACK" as the acknowledgement information, and on the other hand, when the result of the CRC is negative, the MAC processing section 1082 generates a negative response signal "NACK" as the acknowledgement information.

Based on the result of the decoded Uplink Scheduling Grant included in the Physical Downlink Control Channel (PDCCH) received from the layer 1 processing section 1081, the MAC processing section 1082 determines the transport format of the uplink user data and performs the transmission process such as the retransmission control in the MAC layer and the like. Namely, when the information indicating the permission to perform the communications using the shared channel in uplink is transmitted via the Physical Downlink Control Channel (PDCCH) received from the layer 1 processing section 1081, with respect to the user data to be transmitted, the MAC processing section 1082 determines the transport format and performs the transmission process such as the retransmission control and the like and transmits the processed user data to the layer 1 processing section 1081.

The present invention is described above by referring to specific embodiments. However, a person skilled in the art may understand that the above embodiments are described for illustrative purpose only and may think of examples of various modifications, transformations, alterations, changes, and the like. To promote an understanding of the present invention, the specific values are used as examples throughout the description. However, it should be noted that such specific values are just sample values unless otherwise described, and any other values may be used. In the above description, the present invention is described as being divided into several embodiments. However, it should be noted that the division of the present invention into several embodiments is not essential to the present invention. For example, two or more embodiments may be combined on an as-needed basis. For illustrative purposes, the apparatus according to an embodiment of the present invention is described with reference to the functional block diagram. However, such an apparatus may be provided by hardware, software, or a combination thereof. The present invention is not limited to the embodiments described above, and various modifications, transformations, alteration, exchanges, and the like may be made without departing from the scope and spirit from the present invention.

The present application is based on and claims the benefit of priority of Japanese Patent Application No. 2007-121307, filed on May 1, 2007, the entire contents of which are hereby incorporated herein by reference.

The invention claimed is:

1. A base station apparatus to be used in a mobile communication system where Persistent Scheduling is performed, the base station apparatus comprising:
a radio communication unit configured to perform radio communications with a user equipment terminal using radio resources provided every predetermined period based on the Persistent Scheduling;
a first determination unit configured to determine whether either uplink or downlink packet data of the user equipment terminal are required to be retransmitted; and
a generation unit configured to generate a downlink L1/L2 control signal including scheduling information designating the radio resources to be used for the retransmission of the packet data, wherein
when determining that it is required to retransmit the uplink or downlink packet data of the user equipment terminal, the downlink L1/L2 control signal is transmitted to the user equipment terminal and the packet data to be retransmitted are transmitted by using the radio resources designated by the scheduling information.

2. The base station apparatus according to claim 1, further comprising:
a second determination unit configured to determine whether the uplink or downlink packet data of the user equipment terminal are to be transmitted in a talk-spurt period transmitted every first predetermined period, wherein
when determining that the uplink or downlink packet data are not to be transmitted in the talk-spurt period, the radio communications with the user equipment terminal are performed by using the radio resources provided every second predetermined period longer than the first predetermined period.

3. The base station apparatus according to claim 2, wherein
a start timing or an end timing of the talk-spurt period is reported to the user equipment terminal using a MAC control message or a downlink L1/L2 control signal.

4. A method to be used in a base station apparatus to be used in a mobile communication system where Persistent Scheduling is performed, the method comprising:
a providing step of providing radio resources every predetermined period based on the Persistent Scheduling with respect to a specific user equipment terminal;
a radio communication step of performing radio communications with the specific user equipment terminal using the provided radio resources;
a determination step of determining whether either uplink or downlink packet data of the specific user equipment terminal are required to be retransmitted; and
a generation step of generating a downlink L1/L2 control signal including scheduling information designating the radio resources to be used for the retransmission of the packet data, wherein
when determining that it is required to retransmit the uplink or downlink packet data of the specific user equipment terminal, the downlink L1/L2 control signal is transmitted to the specific user equipment terminal and the packet data to be retransmitted are transmitted using the radio resources designated by the scheduling information.

5. A base station apparatus to be used for a mobile communication system where Persistent Scheduling is performed, the base station apparatus comprising:
a radio communication unit configured to perform radio communications with a user equipment terminal using radio resources provided every predetermined period based on the Persistent Scheduling;
a determination unit configured to determine whether uplink or downlink packet data of the user equipment terminal are to be transmitted in a talk-spurt period transmitted every predetermined period; and
a generation unit configured to, when determining that the uplink or downlink packet data are not to be transmitted in the talk-spurt period, generate a downlink L1/L2 control signal including scheduling information designating the radio resources to be used for the transmission of the uplink or downlink packet data, wherein
when determining that the uplink or downlink packet data are not to be transmitted in the talk-spurt period, the downlink L1/L2 control signal is transmitted to the user equipment terminal and the uplink or downlink packet data are transmitted using the radio resources designated by the scheduling information.

6. The base station apparatus according to claim 5, wherein
a start timing or an end timing of the talk-spurt period is reported to the user equipment terminal using a MAC control message or a downlink L1/L2 control signal.

7. A method to be used in a base station apparatus to be used in a mobile communication system where Persistent Scheduling is performed, the method comprising:
a providing step of providing radio resources every predetermined period based on the Persistent Scheduling with respect to a specific user equipment terminal;
a radio communication step of performing radio communications with the specific user equipment terminal using the provided radio resources;
a determination step of determining whether uplink or downlink packet data of the specific user equipment terminal are to be transmitted in a talk-spurt period transmitted every predetermined period; and
a generation step of, when determining that the uplink or downlink packet data are not to be transmitted in the talk-spurt period, generating a downlink L1/L2 control signal including scheduling information designating the radio resources to be used for the transmission of the uplink or downlink packet data of the specific user equipment terminal, wherein
when determining that the uplink or downlink packet data are not to be transmitted in the talk-spurt period, the downlink L1/L2 control signal is transmitted to the specific user equipment terminal and the uplink or downlink packet data are transmitted using the radio resources designated by the scheduling information.

8. A user equipment terminal to be used for a mobile communication system where Persistent Scheduling is performed, the user equipment terminal comprising:
a transmission/receiving unit configured to perform radio communications with a base station apparatus using radio resources provided at each predetermined period; and
a determination unit configured to determine whether downlink packet data transmitted to the user equipment terminal are received within a talk-spurt period repeated at each predetermined period, wherein
when determining that the downlink packet data are not to be received in the talk-spurt period, packet data are extracted by performing a demodulation process, wherein
the downlink packet data are transmitted using a plurality of candidate radio resources provided at each predetermined period.

9. A method to be used in a user equipment terminal to be used in a mobile communication system where Persistent Scheduling is performed, the method comprising:
a radio communication step of performing radio communications with a base station apparatus using radio resources provided at each predetermined period;
a determination step of determining whether downlink packet data transmitted to the user equipment terminal are received within a talk-spurt period repeated the at each predetermined period, wherein
when determining that the downlink packet data are not to be received in the talk-spurt period, packet data are extracted by performing a demodulation process, wherein
the downlink packet data are transmitted using a plurality of candidate radio resources provided at each predetermined period.

* * * * *